June 2, 1964   H. H. GEORGE   3,135,538
FLANGED PIPE JOINT HAVING ONE FLANGE DEFLECTABLE
Filed May 18, 1959   3 Sheets-Sheet 1
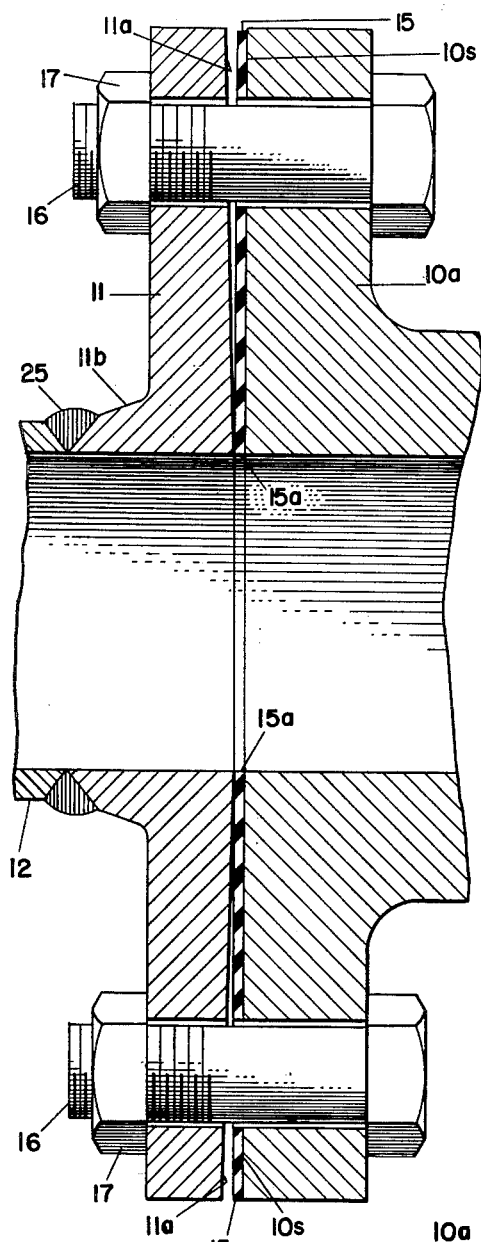
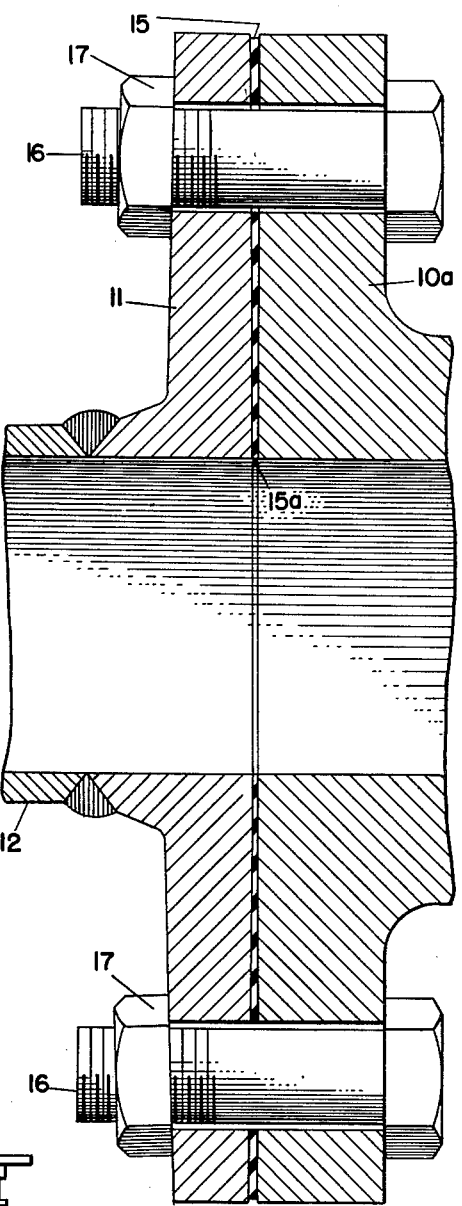
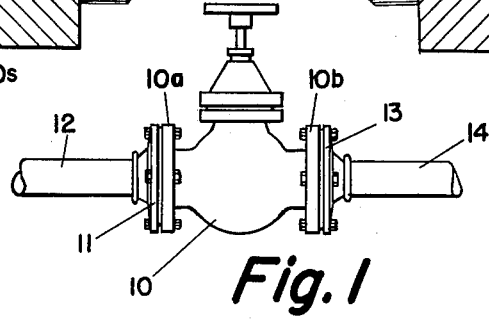
Fig. 2
Fig. 3
Fig. 1

June 2, 1964  H. H. GEORGE  3,135,538
FLANGED PIPE JOINT HAVING ONE FLANGE DEFLECTABLE
Filed May 18, 1959  3 Sheets-Sheet 2

United States Patent Office 3,135,538
Patented June 2, 1964

3,135,538
FLANGED PIPE JOINT HAVING ONE
FLANGE DEFLECTABLE
Henry H. George, Louisville, Ky., assignor to Chemetron Corporation, Chicago, Ill., a corporation of Delaware
Filed May 18, 1959, Ser. No. 813,741
3 Claims. (Cl. 285—363)

This invention relates to piping systems, more particularly to the mechanical joints utilized to interconnect fittings, valves and piping, and has for an object the provision of a mechanical joint which is leak-proof against higher fluid pressures than heretofore obtained for an equal securing force applied between the abutting flanges thereof.

This application is a continuation-in-part of my application Serial No. 606,610 filed August 28, 1956, and which said application has been abandoned in favor of the present application.

Bolted flanges sealed with non-metallic gaskets have been extensively used as mechanical joints in both metallic and non-metallic piping systems. Such gaskets, usually made of a relatively low yield strength material and therefore somewhat plastic in nature, are employed to compensate for the minor defects generally found in the flange contact surfaces and for slight misalignment of the flange faces. The most effective gaskets are those which have a ring shape and are disposed between the bore of the flanges and the bolts. In this way the unit bearing stress of the flange faces on the gasket can readily be made a multiple of the internal pressure acting radially on the gasket. There is also a slight pinching effect of the flanges on the gasket since each flange acts as a cantilever beam and deflects toward the other. In the case of the most frequently used flange material, cast iron, which because it is brittle has a tendency to crack readily under bending loads, the practice most commonly employed to avoid such cracking is to use a full face gasket, that is, one extending to the flange rim. This greatly minimizes the bending moments in the flanges. At the same time, however, it increases the gasket contact area and reduces the ratio of the unit gasket contact pressure to internal pressure for a given applied bolt load. Depending upon the nature and extent of the defects in the flange contact surfaces, it may or may not be possible to seal the joint with a gasket made, for example, of compressed asbestos, which is most commonly employed for the majority of water, oil and gas services, whereas such sealing might be readily accomplished with a ring type gasket. In either event, stronger and therefore more costly bolts are required. Furthermore, in the case of plastic flanges, such high bolt loads tend to cause the bolt heads and nuts to embed themselves in the plastic. This can be offset by the use of metal washers which represent an additional expense. More seriously, the physical properties of plastic flanges are such that with high bolt stresses the flange faces tend to bow between bolt holes which leads to inefficient sealing. This tendency is also present in lightweight metal flanges but generally does not become critical as it does in the case of plastic flanges. Any gasket separates the flange faces and thus is exposed to internal fluid pressure which at all times tend to move the gasket radially of the flanges. Failure of the piping system by cracking of a flange or a "blowout" of a gasket in a piping system can be a serious matter in terms of plant shutdown and in protective piping systems for fire prevention and the like.

In carrying out the present invention in one form thereof, a highly effective seal is provided between the flanges by slightly tapering the face of at least one of them, first to bring into contact with an interposed gasket narrow flange areas immediately surrounding the openings therethrough. Upon tightening a securing means such as a circular array of bolts, one of the flanges, as the one with the slightly tapered face, is under the resulting bending moment deflected to produce a gradual radial increase in sealing area. This will especially be true if one of the flanges, for example, is a relatively thin steel flange, capable of deflecting without hazard to itself, and the other is a comparatively thick cast iron flange. Thus, as securing means, such as the bolts, increase the magnitude of the forces pulling the flanges toward each other, there is a gradual increase, radially of the flanges, of the annular area of the interposed gasket over which the fastening forces are distributed. Initialy, there is a narrow, line-like, annular contact of the tapered flange against the gasket. As the securing forces rise, the narrow line contact changes to an annular area which increases radially of the flanges. Preferably, the interposed gasket is of a material which has more than sufficient strength when under compression to resist blow-out. Such a gasket, however, yields to some degree to take care of small variations (alignment or surface variations), and in yielding its cross-sectional area is decreased to increase the size of the annular sealing area. The annular sealing area is further increased by the decrease in spacing between the flanges due to movement of the flanges together resulting from the rising securing forces. Thus, as the securing forces rise, the annular sealing area increases. Its maximum area, of course, will be attained when its outer dimension corresponds with the outer radius of the flanges. In general, the design will be such that the required force to provide an effective seal is obtained prior to the time the annular sealing area has reached the flange circumference.

The flange and joint of the present invention are to be contrasted with plastic flanges having thick threaded hubs and wide radial ribs extending from the hub to the outer periphery of the flange. Though it has been suggested that such plastic flanges may sometimes be provided with a working face having an inner portion disposed in a plane perpendicular to the axis of the bore and an outer portion inclined in the direction of the hub portion of the flange they are neither suitable for substitution for the steel flanges of the present invention nor do they function in the same way as do the steel welding-neck flanges of the present invention.

In a preferred form of the invention there is provided a lightweight steel flange associated with the relatively heavy cast iron flange, the steel flange having a tapering face. The steel flange, which is relatively thin with respect to the cast iron flange, is flexible for preferential bending movement of the steel flange, gradually and progressively to increase radially the annular sealing area between the flanges. Thus, as the fastening bolts are tightened, there is initially imposed upon the cast iron flange a bending moment (like that applied to a cantilever arm). As flexure or bending of the steel flange toward the cast iron flange occurs, the lever or moment arm giving rise to the bending moment is gradually decreased, thus minimizing the likelihood of over-stressing the relatively brittle cast iron flange with increasing securing forces. There is thus attained a highly effective seal with lower securing forces than required for prior forms of sealing means.

For further objects and advantages of the invention and for a more detailed understanding thereof, reference is to be had to the following description taken in conjunction with the accompanying drawings, in which:

FIG. 1 illustrates a fractional part of a piping system;

FIG. 2 is a cross-sectional view of a pipe joint embodying the invention, with the parts in positions prior to the tightening of the fastening bolts;

FIG. 3 is a sectional view of the joint of FIG. 2 after the tightening of the fastening bolts;

Figure 4:
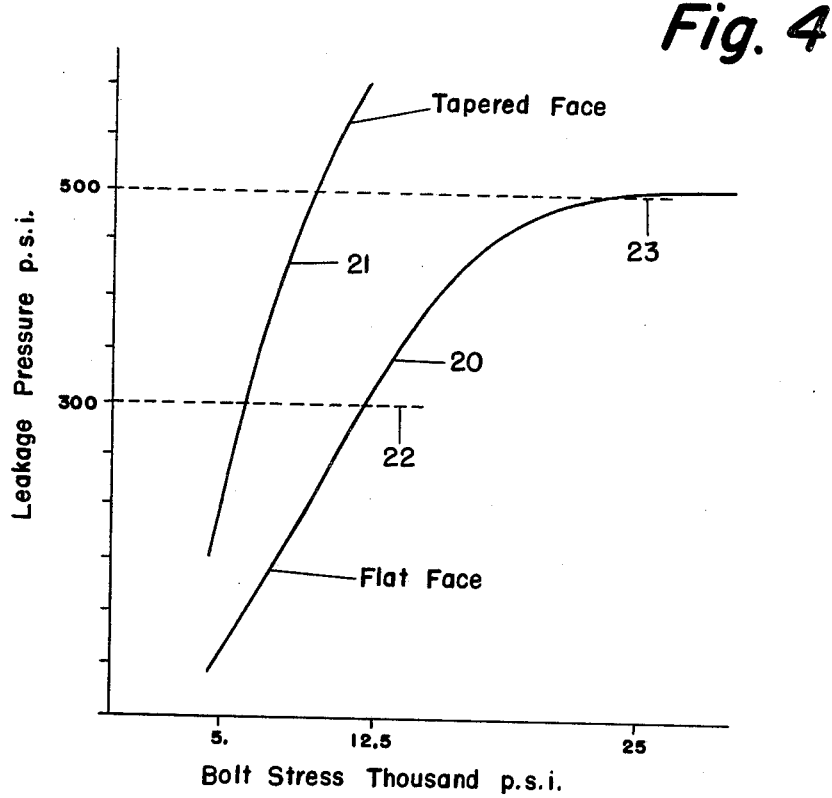
FIG. 4 is a graph illustrating the effectiveness of the seal for securing forces of increasing magnitude.

Referring to the drawings, the fractional part of a piping system illustrated in FIG. 1 is to be taken as suggestive of the multiplicity of connections which must be made in piping systems needed for gas distribution systems and for other applications when the components are made of metallic materials. In FIG. 1 a valve 10 of cast iron has a pair of cast iron flanges 10a and 10b for connection with mating flanges 11 and 13 respectively secured to pipes 12 and 14. As best shown in FIG. 2, each steel flange, the flange 11, associated with a cast iron flange, the flange 10a, is deliberately selected to conform with lightweight specifications and, accordingly, is considerably thinner than the cast iron flange. It has a short frusto-conical hub-portion 11b. In addition, the steel flange 11, of uniform thickness, has a uniformly tapered surface to provide a gradual increase in the spacing between the flanges as the radial distance from the opening therethrough increases. The tapered abutting surface 11a of the flange 11 is inclined about 1½ degrees with respect to the abutting surface 10s of the cast iron flange and by an amount not less than one-half degree and preferably not exceeding about four degrees. Interposed between the face 10s of flange 10a, which extends in a direction normal to the axis of the bore, is a gasket 15 which preferably has flat parallel faces. The gasket 15 is made thin and flat in order to minimize the circumferential area 15a which is exposed to the fluid pressure of the piping system.

It is well known by those skilled in the art that the likelihood of a "blow-out" or failure of the gasket increases with increase in the inner circumferential area, i.e., the thickness of the gasket. Thus while in the past thick gaskets have been used to take care of misalignment and the like, their use has frequently resulted in leakage and even blow-outs, i.e., where the fluid escapes through a failure of the gasket between the flange faces. In accordance with the present invention, the gasket 15 is thin and flat. The initial annular sealing surface is located at the passage or opening through the flanges. There is thus achieved a narrow-gasket type of seal which is recognized as being highly effective in providing a leak-proof joint in terms of the securing forces required in the region of the gasket. While narrow gaskets are susceptible to blow-out failures (unless restrained in grooves), the gasket 15 is wide, can extend to or beyond the bolts, yet in conjunction with the tapered face 11a retains the advantages of the narrow gasket.

The effectiveness of a seal for a given fluid pressure depends at least in part upon the magnitude of the force with which the flanges are pressed against the sealing area of the gasket. The securing or sealing pressure is developed by a circular array of fastening bolts 16 extending through the flanges 10a and 11. As the nuts 17, only two of them appearing in the drawing, are tightened, the bolts are placed in tension, and the magnitude of the tensional forces developed by the bolts and nuts determines the magnitude of the sealing force at the sealing area.

Initially, as the nuts are tightened, the securing force is applied to a small annular sealing area, whence the force per square inch of sealing area may be quite high for an applied securing force of a low order of magnitude.

As the fastening or securing pressure is increased, by tightening of the bolts 16, the gasket 15 is subjected to gradually increasing compressive forces which though first localized near the bore gradually move radially outwardly along the gasket 15. This radial increase in the annular sealing area between the flanges 10a and 11 comes about not only by deformation of the gasket, but also, and largely, by reason of the deflection of the flange 11 toward the cast iron flange 10a. The flange 10a being of thicker cast iron deflects to a negligible degree, whereas the steel flange 11, of materially less thickness than the former, is moved toward the flange 10a. As the sealing area increases, there is a gradual decrease in cantilever stresses applied to the flanges 10a and 11.

Figure 5:
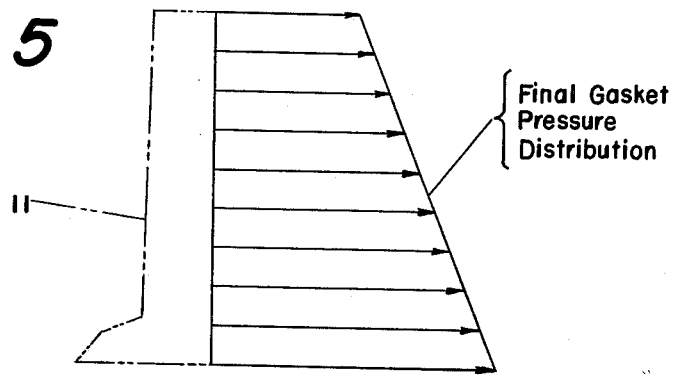
FIG. 5 is a graph of gasket stress or pressure distribution explanatory of operational characteristics of the flanges of the present invention.

The circular array of bolts 16 and nuts 17 may be tightened to a degree such that, FIG. 3, the deflection of the flange 11 will be through an angle approaching that of its original taper. In some instances the flexure of the steel flange 11 will exceed its elastic limit, i.e., upon releasing the nuts 17, the flange 11 will not return to its initial position to re-establish the initial taper—particularly when large, as about four degrees. It is to be further observed, FIG. 5, that as the bolts are progressively tightened, there will be developed at the gasket 15 securing forces which are greatest adjacent the bore and which are distributed throughout the annular area between the flanges, the magnitude of the forces decreasing somewhat from the region near the bore outwardly of the flanges.

The effectiveness of the seal in terms of system pressures and of bolt stress is illustrated in FIG. 4 where the curves 20 and 21 for flanges for six-inch pipes have been plotted with bolt stress as abscissae against leakage pressure as ordinates. The curve 20 illustrates the fact that all other things being the same, with flat face flanges the leakage pressure, defined as the system pressure which initiates leakage at the pipe joint, does not rise as fast with increased bolt stress as with the tapered flange arrangement of curve 21. With structures embodying the present invention, for any given leakage pressure, the required force between the flanges in terms of bolt stress is of a lower order than for the flat, parallel faces on the flanges of the prior art. For a leakage pressure of 300 pounds per square inch, represented by the line 22, a bolt stress of only about 6,250 pounds per square inch is required for the pipe joint including one tapered mating face, as against about 12,000 pounds per square inch for a pipe joint with parallel mating surfaces. The curve 20 has a pronounced knee indicating that further increase of bolt stress does not produce a material increase in the leakage pressure of the conventional pipe joint. Thus, in the region of the line 23 on curve 21, a bolt stress of around 10,000 pounds per square inch for the tapered surface joint of the present invention produces a seal effective up to 500 pounds per square inch. For a corresponding system pressure, curve 20, the bolt stress required on flanges with parallel faces normal to the axis of the bore is shown to be of the order of 23,000 pounds per square inch.

Figure 6:
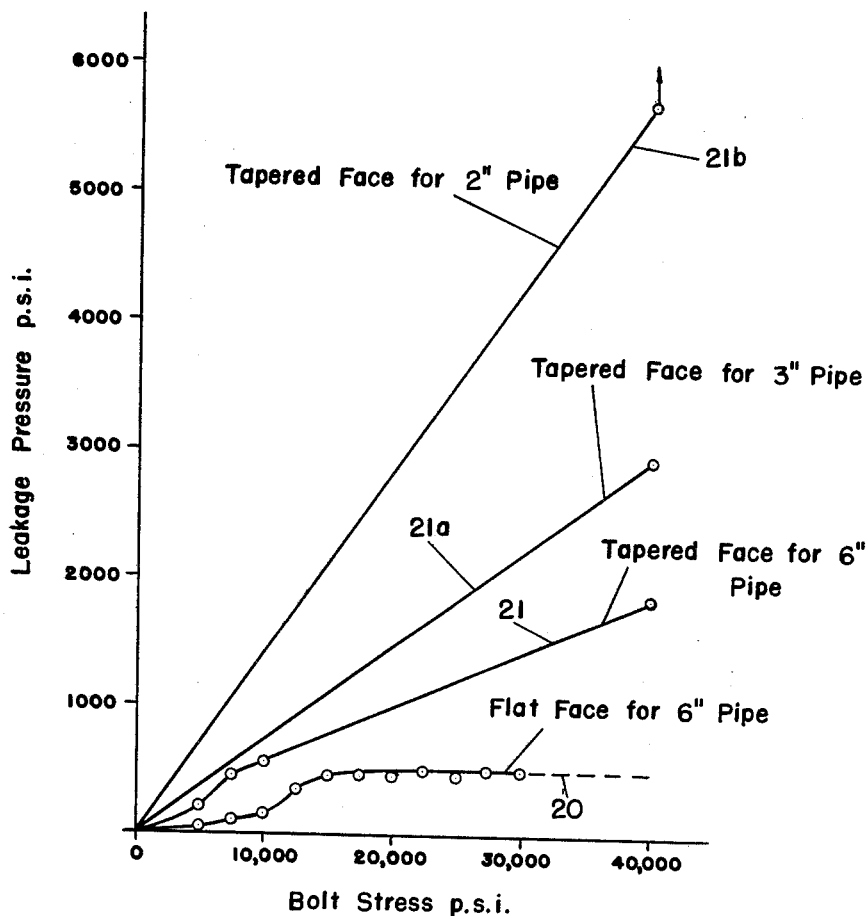
FIG. 6 is a graph similar to FIG. 4.

FIG. 6 is similar to FIG. 4 and includes curves 20 and 21, which, however, are drawn more strictly in conformance with actual test data and are extended to values of bolt stresses of 40,000 pounds per square inch. The leakage pressure for the flange of curve 21 at 40,000 pounds per square inch bolt stress was 1860 pounds per square inch. The curve 20 by extrapolation indicates a leakage pressure of about 500 pounds per square inch. The curve 21a for a pipe flange embodying the present invention used on a three-inch pipe with a bolt stress of 40,000 pounds per square inch indicates the leakage pressure has risen to 2950 pounds. With the same bolt stress, curve 21b for a two-inch pipe shows that the leakage pressure has risen to more than 5700 pounds per square inch.

The provision of an effective seal with relatively low bolt stress is of great importance to piping systems including cast iron flanges. In the past it has been suggested that such flanges be provided with raised faces adjacent the bore. The result of a raised face may be seen by assuming one on each flange of FIG. 2. This approach to the problem, however, has not met with success because as the bolts are tightened, a bending moment is applied to each flange, and cast iron, a brittle material while strong in compression, has a low tensile strength and will crack if subjected to excessive tensile stresses produced by bending moments.

The present invention protects the cast iron flanges against excessive bending stresses in several ways. First, the bolt stress required for a given sealing pressure is much lower than with conventional flange faces. Second, there is preferential flexure of the steel flange 11 toward the cast iron flange 10a. This occurs because the steel flange is materially thinner than the cast iron flange. The result of the preferential bending is a reduction in the moment arms on both flanges as the bolts are tightened. Thus, the gradually expanding area of contact, which includes the sealing zone, moves outwardly the annular fulcrum about which a bending moment is applied to the cast iron flange 10a. With the bolts tightened to stresses well below the point of overstressing the cast iron flanges, the bending moment will be greatly reduced as the annular radially-moving fulcrum approaches the region of the bolt holes.

The gasket 15 need not extend beyond the bolt holes and may terminate short of them. Preferably, the gasket 15 extends at least to the inner sides of the bolts 16. When the flange 11 has flexed to bring such a gasket under pressure throughout its area, the moment arm is materially less than the diameter of one of the bolts 16, since the fulcrum is then at the periphery of each bolt, and the effective moment arm may be taken from the center of each bolt to the supporting area at the outer edge of the gasket 15. The particular taper, the radial dimension of the gasket, and the thickness of the steel flange 11 relative to that of the cast iron flange 10a are dependent variables. With the principles of the present invention understood, those skilled in the art will understand how different designs will be selected for different applications. In general, as the thickness of the steel flange increases, the taper will be decreased and, conversely, as the thickness decreases, the taper may be increased. It will not be less than one-half a degree and not greatly exceeding about four degrees. In most cases, best results are obtained when the ratio of the width of the annular portion of the steel flange divided by the thickness of this portion is between about 4½ and about 5.

More specifically, the annular width of the flange 11 is taken as the difference between the outside diameter and the inside diameter divided by two. The thickness will then be made about one-fifth said width of flange 11, for a companion flange having a much greater thickness, and sufficient for the preferential bending of the tapered flange 11.

In constructing steel flanges, such as shown in FIGS. 2 and 3, the usual methods are applicable. The welding neck 11b, however, may be made relatively short. By providing a short hub portion or welding neck and a beveled edge to receive the welding material forming the welding bead 25, the heat developed in welding the neck 11b to the pipe 12 increases the taper of the face 11a. Thus, with an initial inclination or taper of about 1½ degrees of the face 11a from a line normal to the axis of the bore, after welding the angle will increase, sometimes to double the initial 1½ degree angle. Thus, the lightweight flange 11 with its short welding neck differs from the heavier flanges of the prior art provided with long hub portions or welding necks to minimize distortion of the flange face during welding.

Now that the principles of the invention have been explained, it will be seen that some features may be utilized without adoption of others. For example, the whole of the desired taper may be provided independently of any produced by welding of a flange with a short welding neck. The required taper may be on either or both flanges. Thus at least one of the mating surfaces of the flange members is normally frusto-conical and inclined away from the mating surface of the other of the flange members. It is generally not satisfactory to utilize flat face flanges and a tapered or wedge-shaped cross section gasket, because if this is done, the inner face of the gasket must be made so thick in order to provide the desired taper that an effective seal cannot be obtained. Accordingly, flat gaskets are utilized, that is to say, gaskets which are of substantially uniform thickness between the opposed mating surfaces of the flange portions of the members.

As a further guide to those skilled in the art, the dimensions of the elements in a typical joint in accordance with this invention are as follows:

| | | |
|---|---|---|
| Pipe size | inches | 4 |
| Outer diameter of flanges | do | 9 |
| Length of steel flange (through bore) | do | 1⅛ |
| Thickness of cast iron flange | do | 15/16 |
| Thickness of steel flange | do | ½ |
| Taper on steel flange face | degrees | 1.5 |

These flanges are preferably made up with a ⅛″ thick compressed asbestos full face gasket, and the resulting joint is suitable for system pressures up to 125 pounds per square inch saturated steam (353° F.) and 175 pounds per square inch for liquid and gas at 150° F.

As already indicated, the gasket is preferably thin and flat and slightly compressible or deformable under sealing forces of conventional magnitude. In addition to compressed asbestos, other materials which are inert to the fluids in the piping system such as natural or synthetic rubber may be used, if desired.

Various changes and modifications, in addition to those described herein, may be made without departing from the spirit of this invention whose scope is commensurate with the following claims.

What is claimed is:

1. A pipe joint in a piping system comprising the combination of two metal flange members each having a flange-portion and a hub-portion rigidly secured to a component of the piping system, one of said members being made of a brittle metal of low tensile strength and the other being made of a metal having relative to the material of said one member a high tensile strength and capable of substantial flexure, said flange-portion of said member of high tensile strength being of lesser thickness than said flange-portion of said member of low tensile strength to assure flexure of said flange-portion of said flange member of high tensile strength by joint-tightening forces below those which will cause failure of said flange-portion of said flange member of low tensile strength, said members each having a central bore therethrough, a gasket of uniform thickness between opposed mating surfaces of said flange-portion of said members, said flange-portions of said members extending generally normally to the axis of the bore therethrough, at least one of the mating surfaces of said flange members being normally frusto-conical and inclined away from the mating surface of the other of said flange members through an angle of at least one-half degree and not exceeding about four degrees, fastening members engaging said flanges at locations spaced outwardly from said bore and inwardly of the periphery of said surfaces and disposed circumferentially of said flange-portions for securing the flange members together and for developing said joint-tightening forces upon said flange-portions, the seal produced between said mating surfaces and said gasket being characterized by the development from said joint-tightening forces of compressive forces upon said gasket which in the region adjacent said bore are of materially greater magnitude per unit area thereof than in the region adjacent said fastening members, said gasket in said region adjacent said bore being deformed to a lesser thickness than in the region adjacent said fastening members, said flange-portion of said member of high tensile strength upon application of said joint-tightening forces flexing to decrease said angle and to decrease the moment arm on said metal flange-portion of said member of low tensile strength, said joint-tightening forces during said flexure of said flange-portion of high tensile strength to its final position having a magnitude materially below that which will develop bending moments of an order likely to produce said failure of said flange-portion of said metal member of low tensile strength.

2. A pipe joint in a piping system comprising the combination of a cast-iron flange member having a flange-portion and a hub-portion rigidly secured to a component of the piping system, said cast iron being a brittle material of low tensile strength relative to steel, a companion flange member of steel having a flange-portion and a hub-portion rigidly secured to a component of the piping system, said flange-portion of said steel member being of lesser thickness than said flange-portion of said cast-iron flange member to assure flexure of said flange-portion of said steel flange member by joint-tightening forces below those which will cause failure of said flange-portion of said cast-iron flange member, said members each having a central bore therethrough, a gasket of uniform thickness and of deformable material between opposed mating surfaces of said flange-portions of said members, said flange-portions of said members extending generally normally to the axis of the bore therethrough, the mating surface of one of said flange members from said bore to its periphery being normally uniformly throughout its circumference inclined away from the mating surface of the other of said flange members through an angle of at least one-half degree and not exceeding about four degrees, fastening members engaging said flanges at locations spaced outwardly from said bore and inwardly of the periphery of said surfaces and disposed circumferentially of said flange-portions to secure the flange members together and for developing said joint-tightening forces upon said flange-portions, the seal produced between said mating surfaces by said gasket being characterized by the development from said joint-tightening forces of compressive forces upon said gasket which in the region adjacent said bore are of materially greater magnitude per unit area thereof than in the region adjacent said fastening members, said gasket in said region adjacent said bore being deformed to a lesser thickness than in the region adjacent said fastening members, said steel flange-portion by said application of said joint-tightening forces to deform said gasket in said region immediately surrounding said bore being pulled toward said cast-iron flange-portion to decrease the moment arm on said cast-iron flange-portion, said joint-tightening forces during said flexure of said flange-portion to the final position of said steel flange-portion having a magnitude materially below that which will develop bending moments of an order likely to produce failure of said flange-portion of said cast-iron member.

3. For the pipe joint of claim 2, in which the companion flange member of steel has the inclined mating surface as defined in claim 2 and whose flange-portion from said hub-portion to said periphery has a thickness between the front and back surfaces of said flange-portion which for every radius terminating between the outer limit of said hub-portion and said periphery is substantially uniform circumferentially of the flange.

References Cited in the file of this patent

UNITED STATES PATENTS

| | | |
|---|---|---|
| 2,412,487 | Amley | Dec. 10, 1946 |
| 2,473,102 | Krooss | June 14, 1949 |
| 2,543,963 | Gaffin | Mar. 6, 1951 |
| 2,616,946 | Scheer | Nov. 4, 1952 |
| 2,745,683 | Nihlen | May 15, 1956 |
| 2,739,828 | Schindler | Mar. 27, 1956 |

FOREIGN PATENTS

| | | |
|---|---|---|
| 403,932 | Great Britain | Aug. 16, 1932 |
| 498,370 | Canada | Dec. 15, 1953 |